(12) United States Patent
Chen

(10) Patent No.: US 7,551,368 B2
(45) Date of Patent: Jun. 23, 2009

(54) AUTO-FOCUSING CAMERA MODULE AND AUTO-FOCUSING LENS MODULE

(75) Inventor: Ga-Lane Chen, Santa Clara, CA (US)

(73) Assignee: Hon Hai Precision Industry Co., Ltd., Tu-Cheng, Taipe Hsien (TW)

( * ) Notice: Subject to any disclaimer, the term of this patent is extended or adjusted under 35 U.S.C. 154(b) by 0 days.

(21) Appl. No.: 11/613,973

(22) Filed: Dec. 20, 2006

(65) Prior Publication Data

US 2007/0188889 A1     Aug. 16, 2007

(30) Foreign Application Priority Data

Feb. 10, 2006   (TW) .............................. 95104540 A

(51) Int. Cl.
G02B 15/14    (2006.01)
G02B 1/06     (2006.01)
G02B 7/02     (2006.01)

(52) U.S. Cl. ........................ 359/698; 359/665; 359/666; 359/821

(58) Field of Classification Search ................. 359/698, 359/672, 676, 694, 696, 811, 813, 815, 819, 359/821, 829, 665, 666
See application file for complete search history.

(56) References Cited

U.S. PATENT DOCUMENTS

| | | | |
|---|---|---|---|
| 4,913,536 A * | 4/1990 | Barnea | 359/666 |
| 5,732,288 A | 3/1998 | Muramatsu | |
| 6,167,206 A * | 12/2000 | Hylen | 396/316 |
| 6,501,909 B1 * | 12/2002 | Nishimura et al. | 396/74 |
| 7,221,514 B2 * | 5/2007 | Venema | 359/619 |
| 2004/0155976 A1 * | 8/2004 | Suda | 348/345 |
| 2005/0068444 A1 * | 3/2005 | Oshima et al. | 348/335 |
| 2006/0056042 A1 * | 3/2006 | Kim et al. | 359/666 |
| 2007/0080280 A1 * | 4/2007 | Havens | 250/201.1 |

* cited by examiner

Primary Examiner—Jessica T Stultz
Assistant Examiner—Mahidere S Sahle
(74) Attorney, Agent, or Firm—Frank R. Niranjan

(57) ABSTRACT

An auto-focusing camera module (100) includes a base (110), a first lens barrel (120) mounted on the base, a second lens barrel (130) threadedly engaged with the first lens barrel, a first lens (140) arranged in the second lens barrel, an image pickup module (150) mounted on the base, and a lens assembly (170). The image pickup module is coaxially aligned with the lens. The lens assembly is arranged in the second barrel. The lens assembly has a mounting plate (171) and a plurality of second lenses (172) mounted on the mounting plate. The second lenses each have a distinct effective focal length, and the mounting plate is movable in a manner such that each of the second lenses is selectively aligned with the first lens.

17 Claims, 2 Drawing Sheets

AUTO-FOCUSING CAMERA MODULE AND AUTO-FOCUSING LENS MODULE

BACKGROUND OF THE INVENTION

1. Field of the Invention

The present invention relates generally to auto-focusing camera modules and auto-focusing lens modules, more particularly, to a small sized digital camera module used in a portable electronic device such as a mobile phone or a Personal Digital Assistant (PDA).

2. Description of Related Art

Recently, with the development of wireless communication technologies, digital cameras have become widely used in mobile phones, PDAs, and other electronic devices.

Generally, digital cameras typically use an image pickup device, such as a Charge Coupled Device (CCD) or Complementary Metal Oxide Semiconductor (CMOS) for capturing images. In the digital camera, an object image formed on the image pickup device through a lens is converted into an electrical signal by the image pickup device, and the electrical signal is stored as a digital signal in a mobile phone or PDA in which the digital camera is mounted.

Since the digital camera is desirably to be mounted in mobile phones or PDAs, a fixed focus lens module is usually used to facilitate mounting thereof within a small phone or PDA. However, images photographed by a digital camera with a fixed focus lens module tend to be poor in quality. It is partly due to the fixed focus lens, which is incapable of adjusting focal length to make a clearer image.

What is needed, therefore, is an auto-focusing camera module which is suitable to be used in mobile phones or PDAs.

SUMMARY

An auto-focusing camera module includes a base, a first lens barrel mounted on the base, a second lens barrel threadedly engaged with the first lens barrel, a first lens arranged in the second lens barrel, an image pickup module mounted on the base, and a lens assembly. The image pickup module is coaxially aligned with the lens. The lens assembly is arranged in the second barrel. The lens assembly has a mounting plate and a plurality of second lenses mounted on the mounting plate. The second lenses each have a distinct effective focal length, and the mounting plate is movable in a manner such that each of the second lenses is selectively aligned with the first lens.

An auto-focusing lens module for a camera includes a first lens and a lens assembly. The first lens defines an optical axis. The lens assembly has a mounting plate and a plurality of second lenses mounted on the mounting plate. The second lenses each have a distinct effective focal length, and the mounting plate is movable in a manner such that each of the second lenses is selectively aligned with the first lens.

The present auto-focusing camera module and lens module selects a suitable second lens having a suitable effective focus length form the plurality of second lenses to perform the auto-focusing function. Therefore, the present auto-focusing camera module is capable of adjusting focal length to make a clearer image and is suitable for use in mobile phones or PDAs.

Other advantages and novel features will become more apparent from the following detailed description of present auto-focusing camera module when taken in conjunction with the accompanying drawings.

BRIEF DESCRIPTION OF THE DRAWINGS

Many aspects of the present auto-focusing camera module can be better understood with reference to the following drawings. The components in the drawings are not necessarily drawn to scale, the emphasis instead being placed upon clearly illustrating the principles of the present auto-focusing camera module. Moreover, in the drawings, like reference numerals designate corresponding parts throughout the several views.

DETAILED DESCRIPTION OF THE EMBODIMENTS

Reference will now be made to the drawings to describe a preferred embodiment of the present auto-focusing assembly used in a digital camera in detail.

Figure 1:
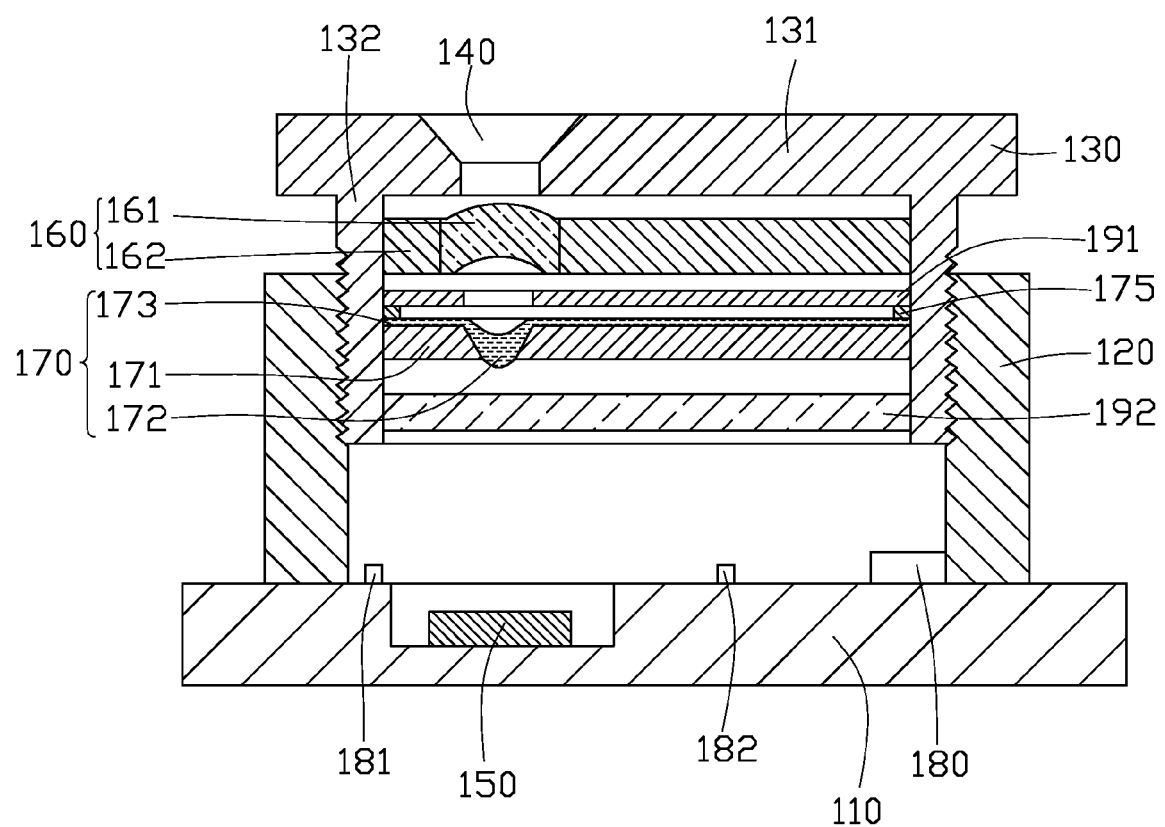
FIG. 1 is a schematic, crossed-sectional view of an auto-focusing camera module in accordance with a preferred embodiment.
Figure 2:
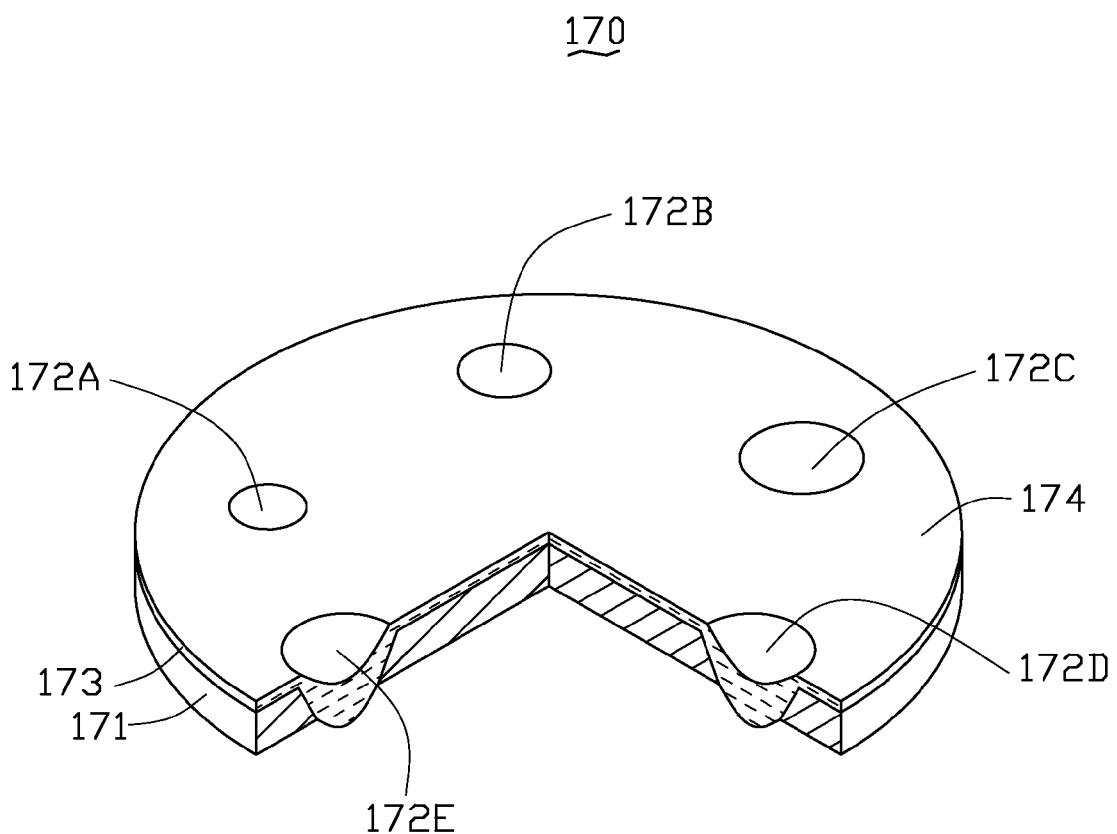
FIG. 2 is a schematic, partial-cutaway view of a lens assembly of FIG. 1.

Referring to FIGS. 1 and 2, a camera module 100 in accordance with a preferred embodiment, includes a base 110, a first lens barrel 120 mounted on the base 110, a second lens barrel 130 threadedly engaged with the first lens barrel 120, an image pickup module 150 mounted on the base 110, a first lens 140 arranged in the second lens barrel 130 and a lens assembly 170. The image pickup module 150 is coaxially aligned with the first lens 140.

The first lens barrel 120 is mounted on the base 110 and is a hollow cylinder. The first lens barrel 120 has an inner screw thread configured for receiving and fixing the second lens barrel 130.

The second lens barrel 130 includes a circular plate 131 and a hollow cylinder 132 perpendicularly extending from the circular plate 131. The hollow cylinder 130 has an outer screw thread configured for being threadedly engaged with the first lens barrel 120. The circular plate 131 has an opening configured for receiving the first lens 140.

The image pickup module 150 is a kind of semiconductor device configured for converting the image into an electrical signal, such as a Charge Coupled Device (CCD) or a Complementary Metal Oxide Semiconductor (CMOS). The image pickup module 150 is coaxially aligned with the lens 140.

The lens assembly 170 is arranged in the second barrel 130 and the lens assembly 170 has a mounting plate 171 and a plurality of second lenses 172 mounted on the mounting plate 171. Each of the second lenses 172 has a distinct effective focal length and the mounting plate 171 is movable in a manner such that each of the second lenses 172 is selectively aligned with the first lens 140. As shown in FIG. 2, the lens assembly 170 has five second lenses 172A, 172B, 172C, 172D and 172E. Each one of the second lenses 172 has a center, and the centers of the second lenses are arranged in a circle, and the mounting plate 171 is rotatable relative to a center of the circle.

Each one of the second lenses 172 may be an optical lens, such as glass lens or plastic lens, and is a non-spherical lens.

Preferably, each one of the second lens 172 is a liquid lens as shown in FIG. 2, such as oil lenses. The lens assembly 170 further includes a liquid containing layer 173, and a high refractive index liquid contained in the liquid containing layer 173. The liquid containing layer 173 includes a reservoir portion 174 and a plurality of meniscus-shaped lens portions serving as the second lenses 172. The mounting plate 171 has a plurality of cavities corresponding to the plurality of meniscus-shaped lens portions to be configured for receiving the plurality of meniscus-shaped lens portions to serve as the second lenses 172. The plurality of meniscus-shaped lens portions communicate with the reservoir portion 174 so that the liquid in the meniscus-shaped lens portions can be transmitted to the reservoir portion 174 and the liquid in the reservoir portion 174 can be transmitted to the meniscus-shaped lens portions. Therefore, the radiuses curvatures of the meniscus-shaped lens portions can be changed, and the effective focal length of the second lenses 172 can be adjusted. Preferably, the refractive index of the high refractive index liquid should be in an approximate range from 1.4 to 2.0.

The camera module 100 further includes a servo system 180, a first position sensor 181 and a second position sensor 182. The first and second position sensors 181, 182 communicate with the servo system 180. The first position sensor 181 is configured for sensing the position of the second lenses 172 and sending a first feedback signal to the servo system 180 to align one second lens 182 coaxially with the first lens 142. The second position sensor 182 is configured for sensing the effective focal length of the second lens 172 which is coaxially aligned with the first lens 142, and sending a second feedback signal to the servo system 180 to adjust the effective focal length of the second lens 172.

The servo system 180 may be arranged on the base 110. Preferably, the servo system 180 may be integrated with a control circuit (not shown) of the image pickup module 150. The servo system 180 can rotate the mounting plate 171 in the second lens barrel 130 using a motor (not shown). The servo system 180 receives a feedback signal of the first position sensor 181 and rotates the mounting plate 171 to select a suitable second lens 172 coaxially aligned with the first lens 140.

The camera module 100 further comprise a closed loop 175 arranged on the liquid containing layer 173. The closed loop is made of an electrically conducting polymer material capable of electromechanical coupling. The closed loop 175 communicates with the system servo 180. The system servo 180 receives a feedback signal of the second position sensor 182 and makes the closed loop 175 change shape, such as expansion or compression, thus correspondingly expanding or compressing the liquid containing layer 173 so as to adjust an amount of the liquid contained in the each of the meniscus-shaped lens portions thereof. Therefore, the amount of the liquid contained in each of the meniscus-shaped lens portions of the liquid containing layer 173 is adjustable so as to adjust the radius curvature of the meniscus-shaped lens portions. That is, the effective focal lengths of the second lenses 172 can be adjusted.

The camera module 100 further includes a fixing lens assembly 160 which is fixed in the second lens barrel 130 to be configured for cooperating with the lens assembly 170. The fixing lens assembly 160 includes a support 162 fixed in the second lens barrel 130 and a third lens 161 configured for cooperating with the second lens 172 of the lens assembly 170. The second lens 162 is coaxially aligned with the lens 140.

The camera module 100 further includes an aperture stop 191 arranged on the lens assembly 170 to be configured for regulating an amount of light passing therethrough. The aperture stop 191 may also regulate light passing through one second lens 172 of the lens assembly 170.

The camera module 100 further includes an IR-cut filter 192 disposed under the lens assembly 170. The IR-cut filter 192 is configured for preventing infrared light from passing therethrough and only permitting visible light to pass therethrough. Therefore, the IR-cut filter 192 may avoid damage to the camera module 100 or the elements caused by the ultraviolet light or the infrared light.

In operation, the lens 140 is used to receive the image, and then the image is transmitted to the image pickup module 150 via the second lens 172 and the third lens 162.

The lens assembly 170 has the plurality of second lenses 172 with different radiuses of curvature, that is, the second lenses 172 have different effective focal lengths. Therefore, a suitable second lens 172, such as the second lens 172B, can be selected to operate with the third lens 162 and the first lens 140 by rotating die mourning plate 171. When changing the image, another suitable second lens 172, such as the second lens 172D, can be selected thus changing the focus on the image pickup module 150. Therefore, the camera module 100 has an auto-focusing function.

Furthermore, in this preferred embodiment, all of the second lenses 172 are liquid lenses. If none of the second lenses 172 is suited to the image, an optimum second lens 172 which has a closest effective focal length, such as the second lens 172C, is selected. With the servo system 180 controlling, the closed loop 175 changes the shape, thus the liquid containing layer 173 connected with the closed loop 175 is expanded or compressed so that the radius of curvature of the second lens 172 changes. That is, the effective focal length of the second lens 172C changes to suit the image. In this way, the camera module 100 performs the auto-focusing function.

Unlike a conventional auto-focusing camera module, the present auto-focusing camera module 100 selects a suitable second lens 172 having an optimum focal length from the plurality of second lenses 172 to perform the auto-focusing function. Furthermore, the selected second lens 172 can have its effective focal length changed through adjusting an amount of the liquid therein, thus achieving accurate auto-focusing. Therefore, the present auto-focusing camera module 100 can perform the auto-focusing function advantageously.

It is to be understood that the above-described embodiment is intended to illustrate rather than limit the invention. Variations may be made to the embodiment without departing from the spirit of the invention as claimed. The above-described embodiments are intended to illustrate the scope of the invention and not restricted to the scope of the invention.

What is claimed is:

1. An auto-focusing camera module, comprising:

a base;

a first lens barrel mounted on the base;

a second lens barrel threadedly engaged with the first lens barrel;

a first lens arranged in the second lens barrel;

an image pickup module mounted on the base, the image pickup module being coaxially aligned with the first lens;

a lens assembly arranged in the second lens barrel, the lens assembly including a mounting plate and a plurality of second lenses mounted on the mounting plate, the second lenses each having a distinct effective focal length, the mounting plate being movable in a manner such that each of the second lenses is selectively aligned with the first lens, the lens assembly further including a liquid containing layer and high refractive index liquid contained in the liquid containing layer, the liquid containing layer including a reservoir portion and a plurality of meniscus-shaped lens portions serving as the second lenses, and the reservoir portion being in communication with the meniscus-shaped lens portions; and a closed loop arranged on the reservoir portion of the liquid containing layer, the closed loop being expandable and compressible, thus correspondingly expanding or compressing the reservoir portion so as to adjust an amount of the liquid contained in each of the meniscus-shaped lens portions such that a focal length associated with each meniscus-shaped lens portion is adjusted.

2. The auto-focusing camera module as claimed in claim 1, wherein each one of the plurality of second lenses has a center, the centers of the second lenses are arranged in a circle, and the mounting plate is rotatable relative to a center of the circle.

3. The auto-focusing camera module as claimed in claim 1, wherein an amount of the liquid contained in each of the meniscus-shaped lens portions of the liquid containing layer is adjustable so as to adjust the effective focal length associated with the corresponding meniscus-shaped lens portion.

4. The auto-focusing camera module as claimed in claim 3, wherein the liquid containing layer is expandable and compressible so as to adjust the amount of the liquid contained in each of the meniscus-shaped lens portions thereof.

5. The auto-focusing camera module as claimed in claim 1, wherein the refractive index of the high refractive index liquid is in an approximate range from 1.4 to 2.0.

6. The auto-focusing camera module as claimed in claim 4, further comprising a servo system mounted on the base, the servo system being configured for rotating the mounting plate in the second lens barrel, and making the liquid containing layer expandable and compressible.

7. The auto-focusing camera module as claimed in claim 6, further comprising a first position sensor and a second position sensor communicated with the servo system respectively, the first position sensor being configured for sensing the position of the second lenses and sending a first feedback signal to the servo system to make one second lens selectively coaxially align with the first lens, and the second position sensor being configured for sensing the effective focal length of the second lens coaxially aligned with the first lens, and sending a second feedback signal to the servo system to adjust the effective focal length of the second lens.

8. The auto-focusing camera module as claimed in claim 1, further comprising at least one fixing lens assembly having a third lens, the fixing lens assembly being arranged in the second lens barrel, and the third lens being coaxially aligned with the first lens to cooperate with the second lens of the lens assembly.

9. The auto-focusing camera module as claimed in claim 1, further comprising an aperture stop configured for regulating an amount of light passed therethrough.

10. The auto-focusing camera module as claimed in claim 1, further comprising an IR-cut filter configured for preventing infrared light from passing therethrough.

11. An auto-focusing lens module for a camera, the auto-focusing lens module comprising:
a first lens, the first lens defining an optical axis;
a lens assembly, the lens assembly including a mounting plate and a plurality of second lenses mounted on the mounting plate, the second lenses each having a distinct effective focal length, the mounting plate being movable in a manner such that each of the second lenses is selectively aligned with the first lens, the lens assembly further including a liquid containing layer and high refractive index liquid contained in the liquid containing layer, the liquid containing layer including a reservoir portion and a plurality of meniscus-shaped lens portions serving as the second lenses, and the reservoir portion being in communication with the meniscus-shaped lens portions; and
a closed loop arranged on the reservoir portion of the liquid containing layer, the closed loop being expandable and compressible, thus correspondingly expanding or compressing the reservoir portion so as to adjust an amount of the liquid contained in each of the meniscus-shaped lens portions such that a focal length associated with each meniscus-shaped lens portion is adjusted.

12. The auto-focusing lens module for a camera as claimed in claim 11, wherein each one of the plurality of second lenses has a center, the centers of the second lenses are arranged in a circle, and the mounting plate is rotatable relative to a center of the circle.

13. The auto-focusing lens module for a camera as claimed in claim 11, wherein an amount of the liquid contained in each of the meniscus-shaped lens portions of the liquid containing layer is adjustable so as to adjust the effective focal length associated with the corresponding meniscus-shaped lens portion.

14. The auto-focusing lens module for a camera as claimed in claim 13, wherein the liquid containing layer is expandable and compressible so as to adjust the amount of the liquid contained in each of the meniscus-shaped lens portions thereof.

15. The auto-focusing lens module for a camera as claimed in claim 14, further comprising a servo system, the servo system being configured for making the mounting plate rotatable, and making the liquid containing layer expandable and compressible.

16. The auto-focusing lens module for a camera as claimed in claim 15, further comprising a first position sensor and a second position sensor communicated with the servo system respectively, the first position sensor being configured for sensing the position of the second lenses and sending a first feedback signal to the servo system to make one second lens selectively coaxially aligned with the first lens, and the second position sensor being configured for sensing the effective focal length of the second lens coaxially aligned with the first lens, and sending a second feedback signal to the servo system to adjust the effective focal length of the second lens.

17. An auto-focusing camera module, comprising:
a base;
a first lens barrel mounted on the base;
a second lens barrel threadedly engaged with the first lens barrel;
a first lens arranged in the second lens barrel;
an image pickup module mounted on the base, the image pickup module being coaxially aligned with the first lens;
a lens assembly arranged in the second lens barrel, the lens assembly including a mounting plate and a liquid containing layer mounted on the mounting plate, high refractive index liquid being contained in the liquid containing layer, the liquid containing layer including a reservoir portion and a plurality of meniscus-shaped lens portions, the reservoir portion being in communication with the meniscus-shaped lens portions, the meniscus-shaped lens portions each having a distinct effective focal length, and the mounting plate being movable in a manner such that each of the meniscus-shaped lens portions is selectively aligned with the first lens; and
a closed loop arranged on the reservoir portion of the liquid containing layer, the closed loop being expandable and compressible, thus correspondingly expanding or compressing the reservoir portion so as to adjust an amount of the liquid contained in each of the meniscus-shaped lens portions such that a focal length associated with each meniscus-shaped lens portion is adjusted.

* * * * *